United States Patent [19]

Nerone

[11] Patent Number: 5,341,068
[45] Date of Patent: Aug. 23, 1994

[54] ELECTRONIC BALLAST ARRANGEMENT FOR A COMPACT FLUORESCENT LAMP

[75] Inventor: Louis R. Nerone, Brecksville, Ohio

[73] Assignee: General Electric Company, Schenectady, N.Y.

[21] Appl. No.: 20,275

[22] Filed: Feb. 18, 1993

Related U.S. Application Data

[63] Continuation-in-part of Ser. No. 766,489, Sep. 26, 1991, abandoned.

[51] Int. Cl.$^5$ ............................................... H05B 37/02
[52] U.S. Cl. .................................. 315/219; 315/209 R; 315/DIG. 7
[58] Field of Search ................. 315/219, 209 R, 208, 315/244, 224, DIG. 7, DIG. 5, 307, 291

[56] References Cited

U.S. PATENT DOCUMENTS

| | | | |
|---|---|---|---|
| 4,443,778 | 4/1984 | Mewissen | 336/90 |
| 4,503,360 | 5/1985 | Bedel | 315/112 |
| 4,546,290 | 10/1985 | Kerekes | 315/209 |
| 4,570,105 | 2/1986 | Engel | 315/58 |
| 4,987,347 | 1/1991 | Leskovec | 315/209 R |
| 4,988,920 | 1/1991 | Hoeksma | 315/101 |
| 5,004,955 | 4/1991 | Nilssen | 315/DIG. 7 |
| 5,055,993 | 10/1991 | Miyata | 315/219 |
| 5,075,602 | 12/1991 | Overgoor | 315/307 |
| 5,083,065 | 1/1992 | Sakata | 315/307 |

OTHER PUBLICATIONS

Application Note AN-973 entitled: "HEXFETs Improve Efficiency, Expand Life Of Electronic Lighting Ballasts" by Peter N. Wood of International Rectifier.

Primary Examiner—Robert J. Pascal
Assistant Examiner—Michael B. Shingleton
Attorney, Agent, or Firm—George E. Hawranko; Stanley C. Corwin

[57] ABSTRACT

A compact fluorescent lamp having an electronic ballast circuit arrangement which exhibits improved thermal management characteristics includes an input conditioning circuit which performs rectification and optionally, power factor correction of a standard power line current. The output of the conditioning circuit is coupled to a high frequency switching circuit which includes a pair of power MOSFET switching devices operated alternately between an on and an off condition in response to a control signal presented to the respective gate terminals thereof. The gate control signal is developed by sampling the load current and generating a speed-up pulse which, by being transformer coupled to the gate terminals, functions as the gate control signal. The gate control signal is of a duration to allow high frequency operation of the lamp without generating EMI in a compliance band between 400 kHz and 30 mHz and further, without subjecting the switching devices to dynamic loss conditions that could result in a thermal runaway condition.

14 Claims, 8 Drawing Sheets

ELECTRONIC BALLAST ARRANGEMENT FOR A COMPACT FLUORESCENT LAMP

This application is a continuation-in-part, of application Ser. No. 07/766,489, filed Sep. 26, 1991 now abandoned.

CROSS-REFERENCE TO RELATED APPLICATION

The present invention is related to material disclosed in the following copending U.S. Patent Application which is assigned to the same assignee as the present invention:

Ser. No. 07/766,608, entitled: "Compact Discharge Lamp Having Improved Thermal Management Characteristics", filed Sep. 26, 1991 by M. M. Minarczyk et al.

FIELD OF THE INVENTION

This invention relates to an electronic ballast circuit for a compact fluorescent lamp. More particularly, this invention relates to such an electronic ballast circuit as can achieve the necessary starting and operating characteristics for a multi-axis compact fluorescent lamp at a high switching rate without generating a significant amount of electromagnetic interference (EMI) and without experiencing significant dynamic losses. This invention further relates to the application of such an electronic ballast to electroded as well as electrodeless fluorescent lamp products where it is desired to achieve an optimum thermal operating condition of the lamp over the expected long life of such a lamp.

BACKGROUND OF THE INVENTION

In the field of residential and/or consumer lighting, there have been significant efforts made in the past several years to encourage more widespread public use of a compact fluorescent lamps in place of less efficient incandescent lamps. Because of the significant energy savings that a fluorescent lamp offers over the use of an incandescent lamp while still attaining a comparable level of light output, public acceptance of such a lamp could contribute to the overall aim of conserving energy and the natural resources that are used to generate such energy. It is also a significant advantage that such compact fluorescent lamps have a considerably longer life than a conventional incandescent lamp. To this end, compact fluorescent lamps have been introduced having a standard type of lamp base so that they may be inserted into a typical lamp socket. An example of such a compact fluorescent lamp can be found in U.S. Pat. No. 4,503,360 issued on Mar. 5, 1985 to D. E. Bedel. Although the lamp of this patent is an electroded compact fluorescent lamp, it is possible to achieve an even longer lamp life using an electrodeless fluorescent lamp as described in U.S. Pat. No. 4,010,400 issued to Hollister on Mar. 1, 1977.

As with most fluorescent or low pressure discharge lamp devices, it is necessary to provide a ballasting circuit to perform the function of conditioning the current signal used to drive the discharge lamp. Examples of typical ballasting circuits for a compact fluorescent lamp can be found in U.S. Pat. Nos. 4,443,778 and 4,570,105 issued respectively on Apr. 17, 1984 to J. A. C. Mewissen and Feb. 11, 1986 to H. J. Engel. It will be noted that the ballasting circuits described in each of these patents relies on an electromagnetic type of ballasting; that is, one that requires the use of a magnetic core transformer to condition the current signal. Because such a ballasting arrangement operates at a power line current frequency of 60 hz which can result in lamp flicker, it has been determined that an electronic high frequency ballast that would eliminate the occurrence of lamp flicker or light variation, would be preferable. An example of a high frequency electronic ballast arrangement for a gas discharge lamp can be found in U.S. Pat. No. 4,546,290 issued to B. Kerekes on Oct. 8, 1985. An example of a circuit for an electrodeless fluorescent product can be found in U.S. Pat. No. 4,383,203 issued to Stanley on May 10, 1983. It will be noted that typical electronic circuits of this type are of a self-resonant variety wherein a sample of the resonant current is taken to signal the switching of the bipolar transistor. Though this arrangement has proven to be simple and reliable in some applications, its efficiency at operating frequencies above 20 kHz is less desirable since the dynamic losses in the switching devices can be prohibitive. The term "dynamic losses" can be considered as that amount of energy in the circuit that is diverted away from the energization of the lamp and is otherwise lost in the form of heat dissipated. As such, if dynamic losses are not kept in check, the switching devices could experience a thermal runaway condition or operate at such a high temperature that reliability guidelines are exceeded. U.S. Pat. No. 4,988,920 issued on Jan. 29, 1991 to G. S. Hoeksma illustrates a more recent example of an electronic ballast circuit for a typical fluorescent lamp. In this patent, semiconductor switching devices such as metal oxide semiconductor field effect transistors (MOSFETs) are utilized to achieve the necessary switching frequency that allows the ballast to operate at a higher frequency than does a typical electromagnetic ballast arrangement or even electronic ballast which uses bipolar transistors for switching. It has been found that MOSFET devices offer advantages over the bipolar transistor approach and that such MOSFETs can also be reliably operated at yet a higher frequency than the bipolar devices. In addition to the advantage that an electronic ballast will weigh significantly less than its magnetic counterpart, the electronic ballast, by operating at the higher frequency, provides for a higher light output, avoids the problem of light flicker and further reduces light output variation relative to a ballast operating at 60 hz.

One of the inherent considerations in the design of the compact fluorescent lamp and an electronic circuit for driving such compact fluorescent lamp is the avoidance of generating electromagnetic interference (EMI) in a particular frequency range established by the U.S. Federal Communications Commission (FCC) as being between 400 kHz and 30 mHz, a range that can be referred to as the compliance band. An example of a lamp ballasting arrangement using MOSFETs and operating at a high frequency can be found in Application Note AN-973 entitled "HEXFETs, Improve Efficiency, Expand Life of Electronic Lighting Ballasts" published by International Rectifier of El Segunda, Calif. A circuit embodying the discussion of this publication is provided herewith as FIG. 1 which will be described hereinafter in further detail. It is sufficient to note at this time however that though the circuit of this approach avoids the problem of increased dynamic losses by increasing the switching speed, such increased switching speed results in an increased EMI which may fall within the previously stated compliance band. One approach to avoid emitting EMI in the compliance band is to utilize an interference shielding device such as a filter. Such devices however are bulky and costly thereby adding to the weight, size and/or cost of the discharge lamp. Therefore, it would be advantageous if one were to provide an electronic ballasting circuit for a compact fluorescent lamp that would operate without experiencing dynamic losses that could affect performance and life expectancy yet achieve this improved performance without creating significant amounts of EMI.

SUMMARY OF THE INVENTION

The present invention provides a ballast circuit arrangement particularly suited for application in a compact fluorescent type of discharge lamp. The ballast circuit arrangement is configured in a manner to operate within a compact lamp housing base which includes a standard Edison base thus making the overall compact fluorescent lamp product operable in a standard lighting socket. Operation of this lamp ballast arrangement within this housing base is achieved without the adverse effect of generating electromagnetic interference within the previously noted compliance band. Moreover, the electronic ballast circuit of the present invention allows for the avoidance of the EMI problem without incurring a common adverse side effect of creating dynamic losses that could otherwise lead to a thermal runaway condition within the compact housing base in which the electronic components are disposed.

In accordance with the principals of the present invention, there is provided an electronic ballast circuit arrangement for a compact fluorescent lamp which is operable using standard household line current connected through a screw base portion disposed at the bottom of a housing base in which the electronic ballast circuit is located. The input power is first coupled to a conditioning circuit which performs the function of rectification and, as an option, power factor correction. This conditioned DC voltage is coupled to the input of a high speed switching circuit arrangement. The switching circuit arrangement generates a high frequency rectangular voltage waveform in response to a control signal having a predetermined duration and magnitude associated therewith. The high frequency rectangular voltage waveform is applied to a resonance circuit which is effective for generating an operating signal capable of driving the compact fluorescent lamp at an appropriate operating frequency. A sampling and switch control circuit arrangement is coupled to the resonance circuit in which the fluorescent lamp is disposed and is effective for sensing the current in the resonance lamp circuit and deriving therefrom, the control signal which operates the switching circuit arrangement. The control signal is selected to operate for a predetermined duration such that the switching circuit arrangement will not generate EMI at the previously discussed compliance range. Additionally, the switch control circuit is further effective for limiting the rate of change in the voltage component of the power that must be dissipated by the switching circuit arrangement and thus insuring that the switching circuit arrangement does not experience noticeable dynamic losses. The resonance circuit of the present invention can be modified in an appropriate manner so as to adapt between usage on an electroded or an electrodeless compact fluorescent lamp.

BRIEF DESCRIPTION OF THE DRAWINGS

In the following detailed description, reference will be made to the attached drawings in which.

DETAILED DESCRIPTION AND OPERATION

Figure 1:
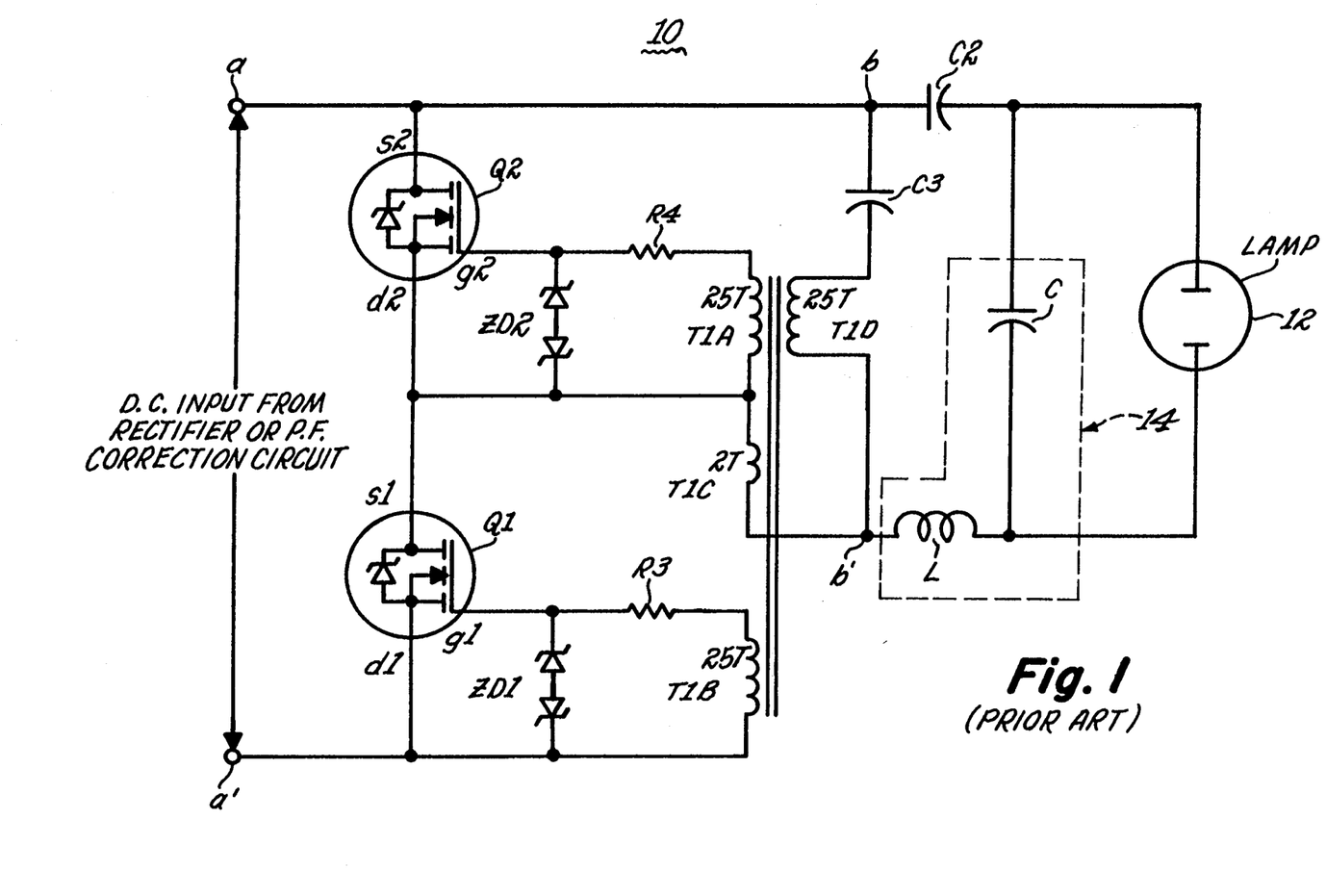
FIG. 1 is a schematic representation of an electronic ballast circuit for a fluorescent lamp constructed in accordance with the prior art.

It is to be understood that in the following description, like reference numerals designate like or corresponding elements throughout the several figures. As seen in FIG. 1, a prior art electronic ballast arrangement for a compact fluorescent lamp shown generally as reference 10 is effective for converting a standard power line current into a high frequency pulsed signal for driving the compact fluorescent lamp 12. The ballast converter circuit 10 receives a DC input signal at terminals a-a', which input signal has been derived from an AC input power line which has been rectified and optionally, corrected for power factor by a rectification and power factor correction circuit (not shown). The DC input signal is coupled across a pair of serially connected power MOSFETs designated Q1 and Q2 and which can be provided by International Rectifier of El Segunda, Calif. with their product designated the HEXFET ® MOSFET (HEXFET is a registered trademark of International Rectifier). The power MOSFETs Q1 and Q2 are effective upon receiving a control signal at the respective gate terminals thereto (g1 and g2) for alternately switching between an on and an off condition at a high frequency thereby achieving a high frequency oscillation and allowing the ballast designer to avoid the problems that a self-resonant type of ballast experiences, namely, such a ballast typically cannot operate at a frequency above 20 kHz without experiencing a significant drop in efficiency. As seen in FIG. 1 however, to achieve the high frequency operation of Q1 and Q2, it is necessary to inject a pulse of current at the gate terminals g1 and g2 in order to speed up the switching operation. The current pulse that is injected onto the respective gate terminals g1 and g2 is obtained from the shunt circuit arrangement which is shown disposed across nodes b-b' of the overall ballast converter circuit 10 and which consists of capacitor C3, and a tertiary winding T1D of the ballast transformer T1. Also connected across nodes b-b' in a parallel manner to the previously mentioned shunt circuit arrangement, is the series resonant lamp circuit which consists of the resonant circuit 14, having the inductor and capacitor elements L and C selected in size using conventional design means to achieve the desired operating frequency of the lamp 12, blocking capacitor C2 and the compact fluorescent lamp 12. The prior art ballast circuit arrangement 10 of FIG. 1 further includes first and second zener diodes ZD1 and ZD2 disposed between the respective gate and drain terminals of MOSFETs Q1 and Q2 for the purpose of protecting such respective gate terminals g1 and g2 in the event of an overvoltage condition. Additionally, resistors R3 and R4 are intended to improve waveform stability and to reduce the potential for high frequency oscillations occurring as a result of the high switching speeds at which Q1 and Q2 are expected to operate.

In the operation of the electronic ballast arrangement 10 shown in FIG. 1, the dynamic losses are reduced by the fact that the switching speed is increased, the theory being that by increasing the speed-up signal such that the switches are operated to the on condition at a much faster rate, energy cannot flow into the switching devices as opposed to the load circuit, the path to which the switching device Q1 or Q2 opens when in the on condition. However, it must be understood that the EMI caused by this faster switching also occurs at a higher frequency. As such, the performance of the ballast arrangement 10 of FIG. 1 must be evaluated from the standpoint of whether such EMI falls within the previously mentioned compliance band. The fundamental component resulting from the rate of change in voltage associated with the high frequency pulse injected onto the switching devices Q1 and Q2 to increase speed, can be represented by the equation:

$$\omega_1 = \pi/t_r \qquad (1)$$

where:

$\omega_1$ is the fundamental component of frequency associated with the rate of change of voltage (dv/dt), and $t_r$ is the rise time of the voltage in seconds.

From this relationship, it can be seen that as $t_r$ decreases so as reduce the switching interval; that is, increase switching speed, the fundamental component of frequency is increased. For instance, if $t_r$ were to be selected as 100 nS (nanoseconds), $\omega_1$ would equal 10 Mr/s (megaradians per second) which is approximately equivalent to 1.592 mHz, a value which is clearly within the FCC compliance band of 400 kHz to 30 mHz. The capability of generating this speed up pulse which results in the fundamental component falling within the compliance band results from the fact that the speed up winding (T1D in FIG. 1) is connected across the output of the ballast arrangement 10 shown in FIG. 1. Because of this shunt circuit arrangement (C3 and T1D), energy stored in the inductor L of resonant circuit 14 allows current to transfer very rapidly from the switching device Q1 or Q2 which is turning off, to the switching device Q1 or Q2 which is turning on. This rapid transition of current would result in a relatively large rate of change in voltage (dv/dt) thus resulting in the generation of EMI in the compliance band.

Figure 2:
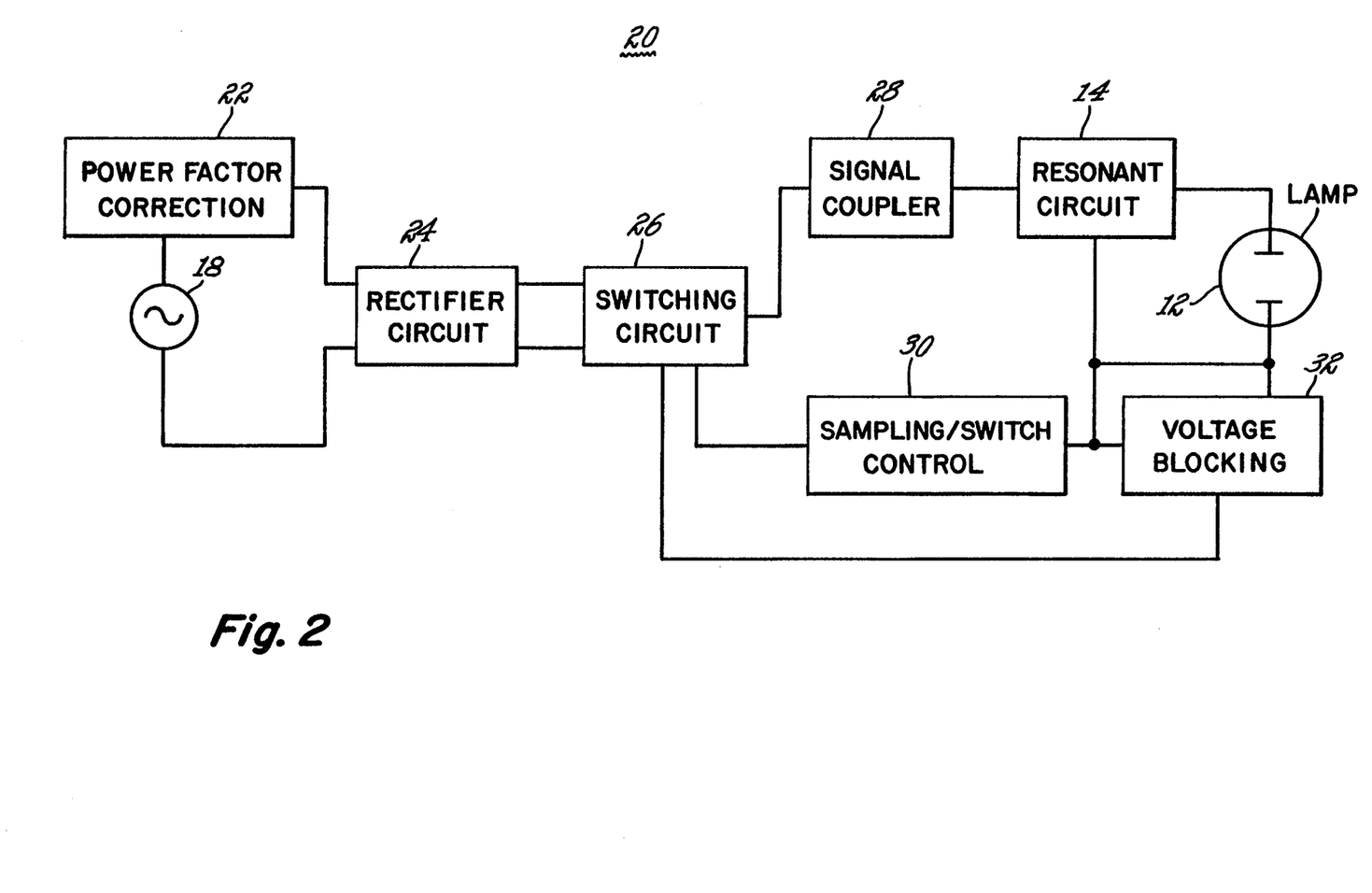
FIG. 2 is a system overview in block diagram form of an electronic ballast circuit constructed in accordance with the present invention.
Figure 4:
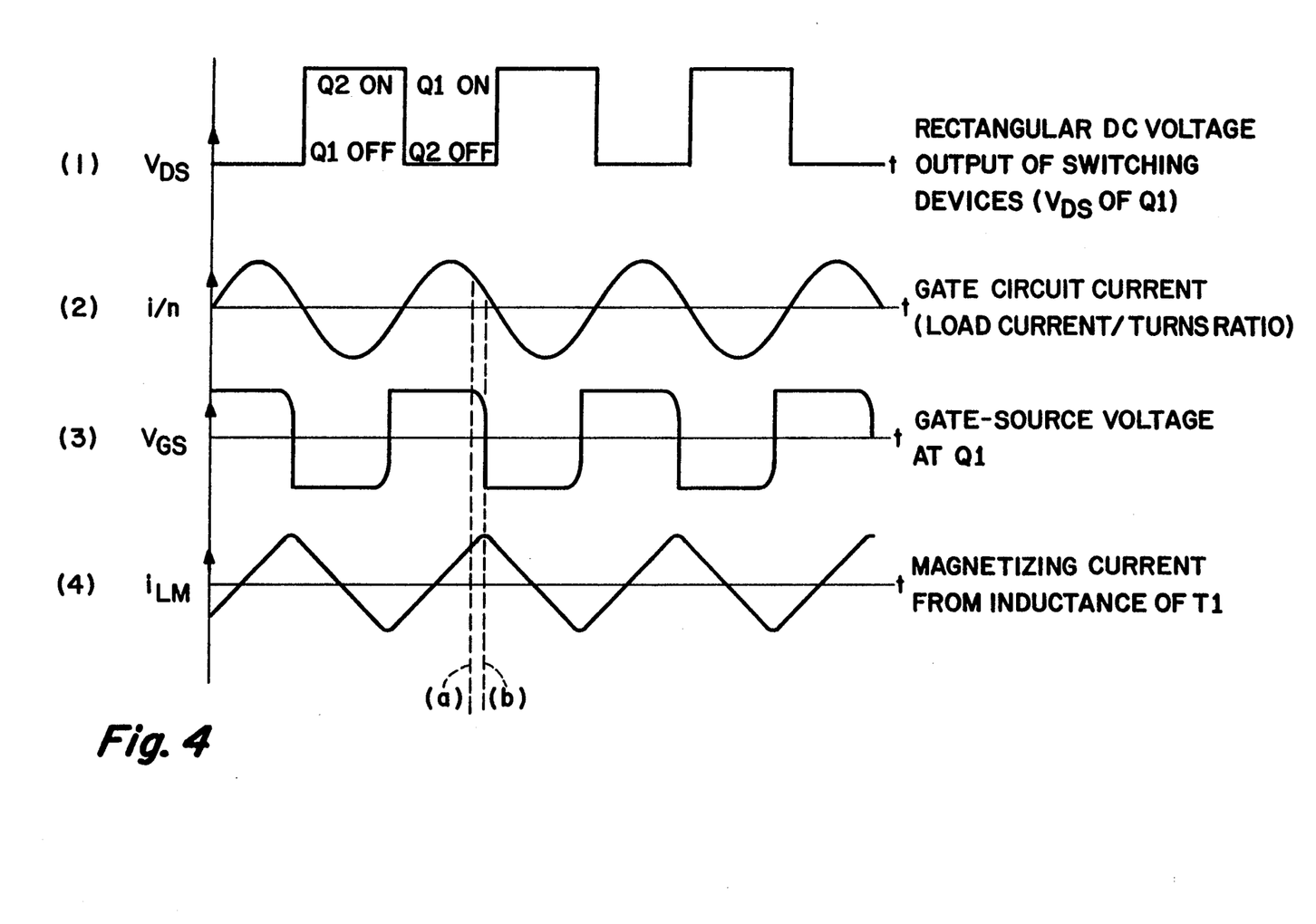
FIG. 4 is a graphical representative of various waveform patterns associated with the switching operation of the ballast circuit of the present invention.

Referring now to FIG. 2, it can be seen that an electronic ballast arrangement 20 is proposed which, in operation, utilizes a speed-up control signal which is of a longer duration then that utilized in the operation of the circuit shown in FIG. 1, yet avoids dynamic loss problems typically associated with a longer duration control signal. Such dynamic loss conditions typically occur in a slower switching speed environment because the switching devices are required to handle a higher power level caused by the increased change in voltage with respect to time. As shown in block diagram form, the ballast circuit 20 includes conventional components 22 and 24 for performing the respective functions of power factor correction (if necessary) and rectification to the input power line current shown as source 18. The output of the rectifier circuit 24 is coupled to the switching circuit 26 where such output is converted to a high speed rectangular voltage waveform shown as waveform (1) in FIG. 4. This rectangular voltage waveform is generated as a function of the controlled speed of switching of the switching circuit 26, which control feature will be described hereinafter in further detail in conjunction with the description of the sampling/switch control function shown as reference 30. The output of the switching circuit 26 is communicated to a signal coupling device 28 which is effective for providing impedance matching between the switching circuit 26 and the resonant circuit 14. As previously discussed with respect to FIG. 1, the resonant circuit 14 includes an inductor L and capacitor C element which are selected in size so as to provide the appropriate operating frequency drive signal to the lamp 12. A typical value of an operating frequency for a high frequency discharge lamp is on the order of 40–200 kHz. For representative inductive and capacitive values to achieve an operating frequency in this range, reference is hereby made to the attached TABLE I. Voltage blocking device 32 is also provided across the lamp electrode 12b so that DC voltage present at the source terminal s1 of Q1 and the drain terminal d2 of Q2 cannot be coupled directly to the lamp 12. In the example of the electrodeless fluorescent lamp however, operating frequencies in the range of up to 20 mHz are contemplated which could require additional EMI shielding considerations as are discussed in U.S. Pat. Nos. 4,940,923 and 4,727,294.

In order to improve the switching speed of the switching circuit 26 but only in a manner to prevent dynamic losses without creating EMI in the compliance band, the sampling/switch control circuit 30 shown in FIG. 2, samples or senses the value of the current signal driving the lamp 12 and couples such sampled current signal back to the switching circuit 26. The sampling/switch control circuit 30 includes an arrangement for limiting the rise in voltage over time of the sampled current signal used for this speed up process.

Figure 3:
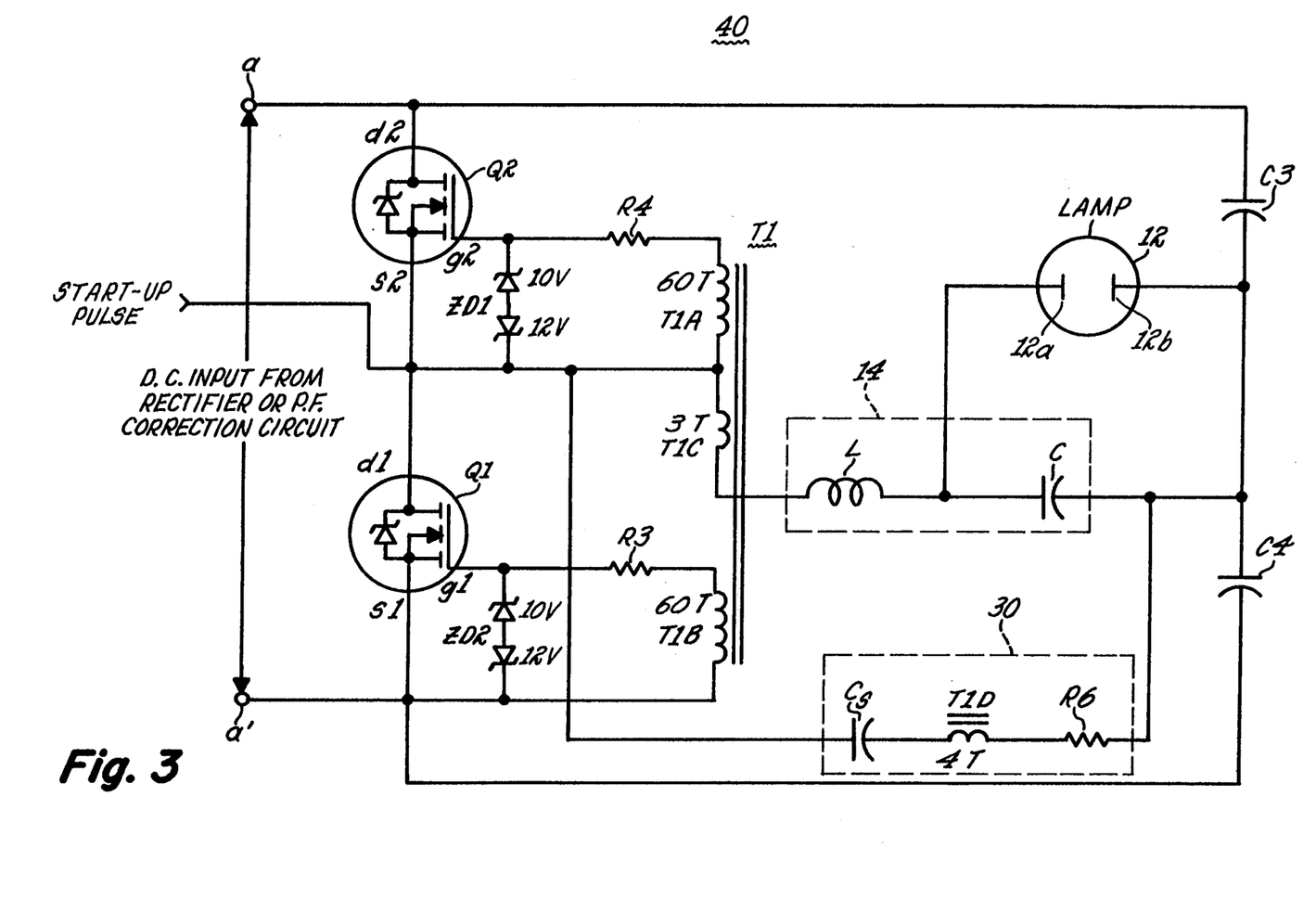
FIG. 3 is a schematic representation of the electronic ballast circuit shown in FIG. 2 in block diagram form.

As seen in FIG. 3, the components that make up many of the functional blocks from the system block diagram of FIG. 2 are illustrated. Typical values of the components shown in FIG. 3 can be found in the attached TABLE I. Similar to the prior art illustration of FIG. 1, the output of the rectifier circuit 24 is shown as being coupled across input terminals a-a' which are in turn connected to the drain terminal d2 of MOSFET Q2 and the source terminal s1 of MOSFET Q1. MOSFETs Q1 and Q2 are connected in a serial arrangement according to conventional practice as described in the aforementioned Application Notes No. AN-973 published by International Rectifier. Additionally connected in a conventional manner as previously described with respect to FIG. 1 are the diode devices ZD1 and ZD2 which are actually comprised of a pair of zener diodes having voltage ratings as indicated in FIG. 3. In order to initiate oscillation of the switching devices Q1 and Q2, a start-up charging circuit (not shown) generates a turn-on voltage pulse which is coupled to gate g1 of switching device Q1. For such purpose, it is possible to use an RC network (not shown) operable in conjunction with a SIDAC device (not shown) in a manner as described in the previously referenced Application Note AN-973. The gate drive signal coupled to the respective gate terminals g1 and g2 is illustrated as waveform (3) of FIG. 4. Ideally, such signal should be rectangular, however, in practice, there is a decay associated with the gate drive signal which commences when the gate circuit current (waveform (2)) and the magnitizing current (waveform (4)) cross as shown at time (a) in FIG. 4. As further seen in FIG. 4, time (b) is that point at which the alternate switch is being turned on. With switching device Q1 turned on, current flows through the 3-turn primary winding T1C, which was designated signal coupler 28 in FIG. 2. The 3-turn primary winding T1C is then connected to the resonant circuit 14 which includes inductor L and capacitor C. Coupled at the juncture between the inductor L and capacitor C of the resonant circuit 14, is the electrode 12a of the lamp 12; electrode 12b of lamp 12 is coupled to the resonant circuit 14 at the opposite end of the capacitor C as the electrode 12a. Electrode 12b is also coupled between a pair of series connected blocking capacitors C3 and C4 which are alternately effective depending on which switching element Q1 or Q2 is operational, for preventing any DC voltage from affecting lamp operation.

Figure 5:
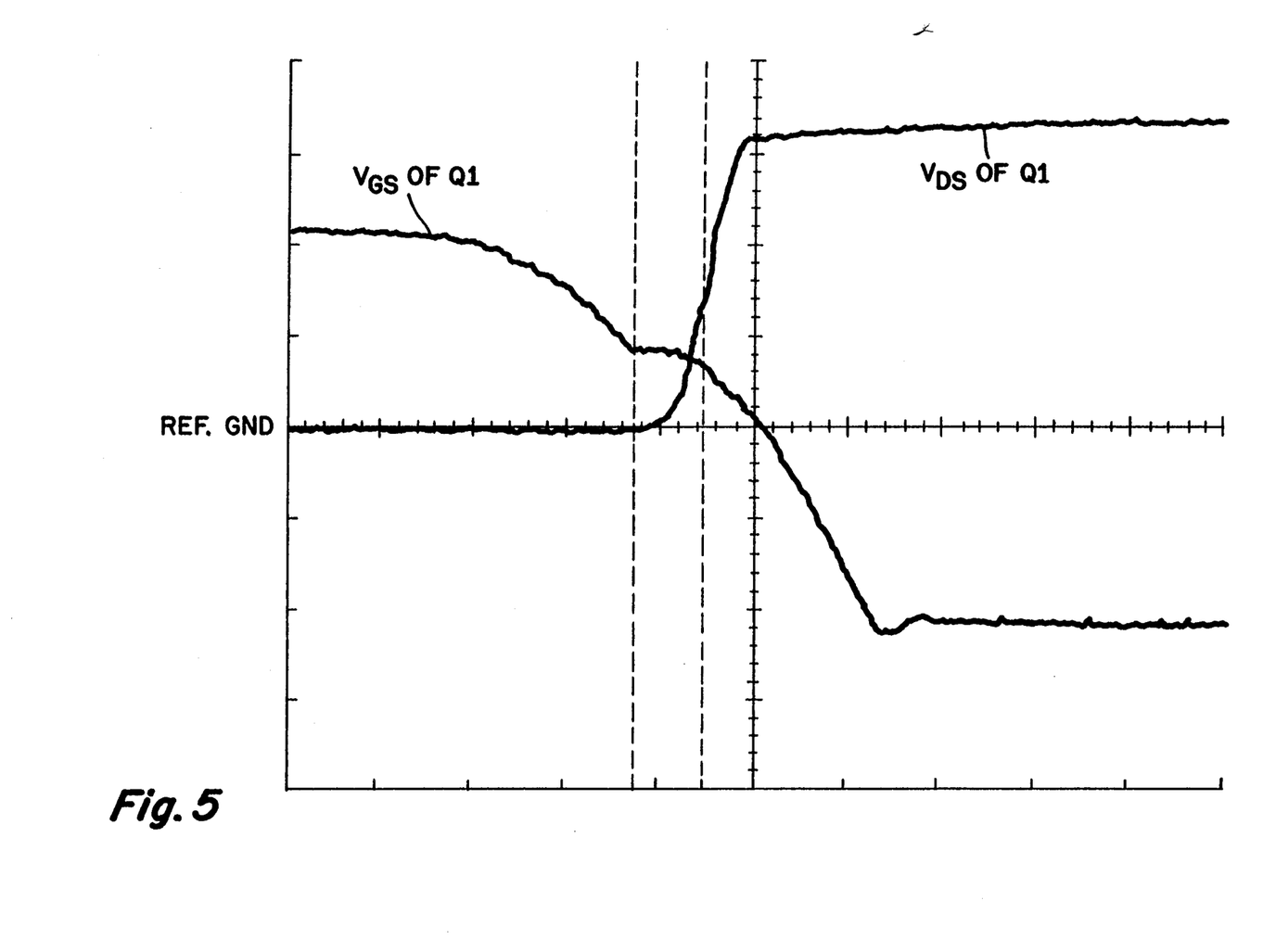
FIGS. 5 through 7 are graphical representations of the various signals associated with the switching of the MOSFETs.
Figure 7:
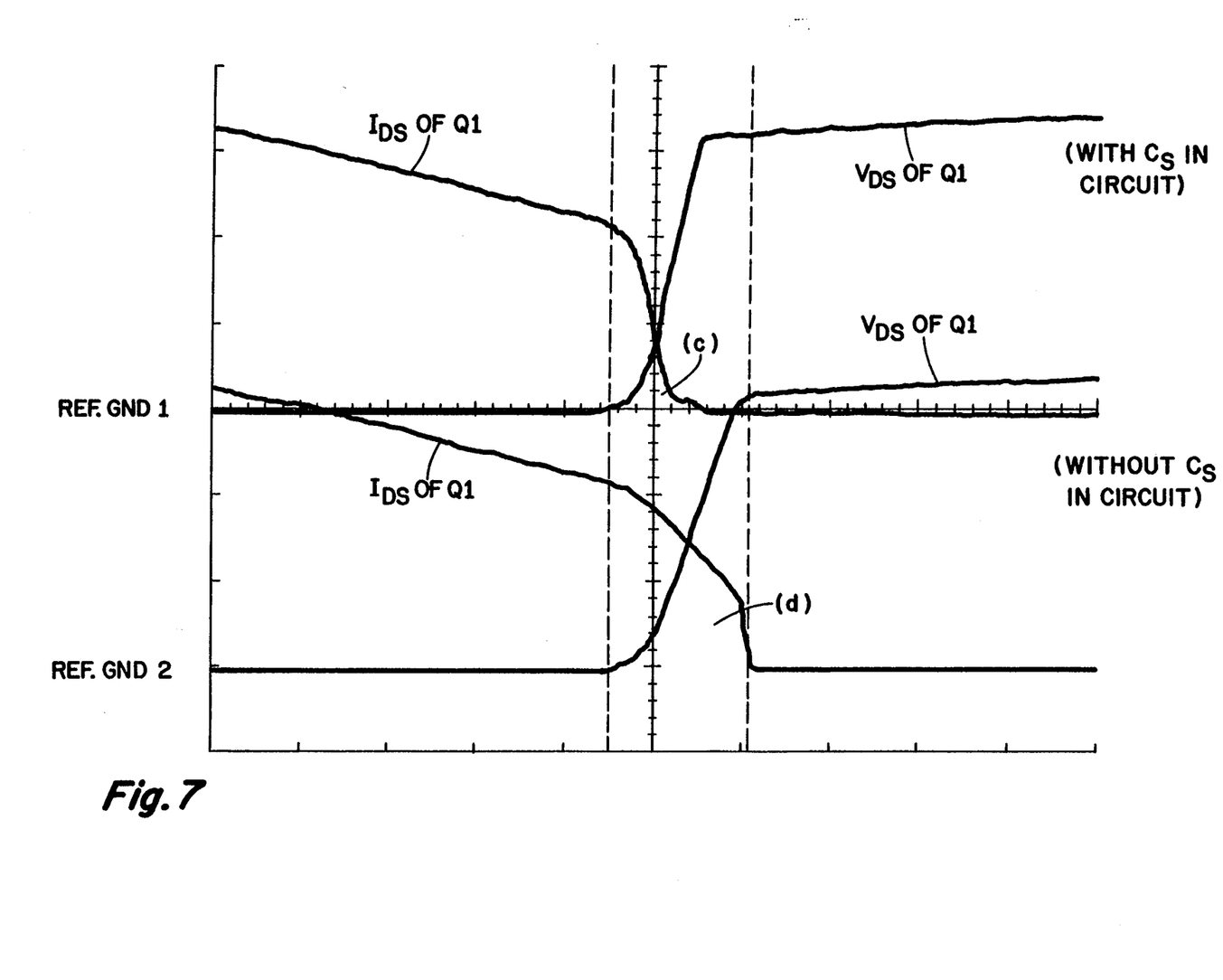

For purposes of controlling the switching operation of the switching devices Q1 and Q2, a sample/switch control circuit is connected at the junction point where the resonant circuit 14 is coupled to electrode 12b of the lamp 12. This control arrangement 30 is effective for increasing the speed of the switching operation over that which would otherwise occur due to the operating frequency of the lamp 12. It should be understood that although the switching devices Q1 and Q2 normally operate at the operating frequency of the lamp, with the gate drive signals to the respective switching devices being derived by a transformer coupling action between the 3-turn primary winding T1C and the 60-turn windings T1A and T1B, the response times of the gate drive signals are poor due to their proportionality to the load current through winding T1C. As previously discussed with respect to waveform (3) of FIG. 4, the gate drive signal in practice has a decay associated therewith. Referring now to FIG. 5, it can be seen that this decay is represented as a plateau and occurs for that period of time during which the previous switching device has turned off and the alternate switching device has not yet turned on. At this time, it can be appreciated that energy cannot flow back into the load circuit and must therefore be dissipated in the form of heat given off by the switching circuit. By adding snubbing capacitor Cs, this otherwise lost energy can be diverted back into the load circuit. As an example of the reduced heat advantage, measurements taken between the circuits represented in FIG. 7 show nearly a 30° C. temperature reduction (49° C. top, 78° C. bottom) for the circuit of the present invention.

Figure 6:
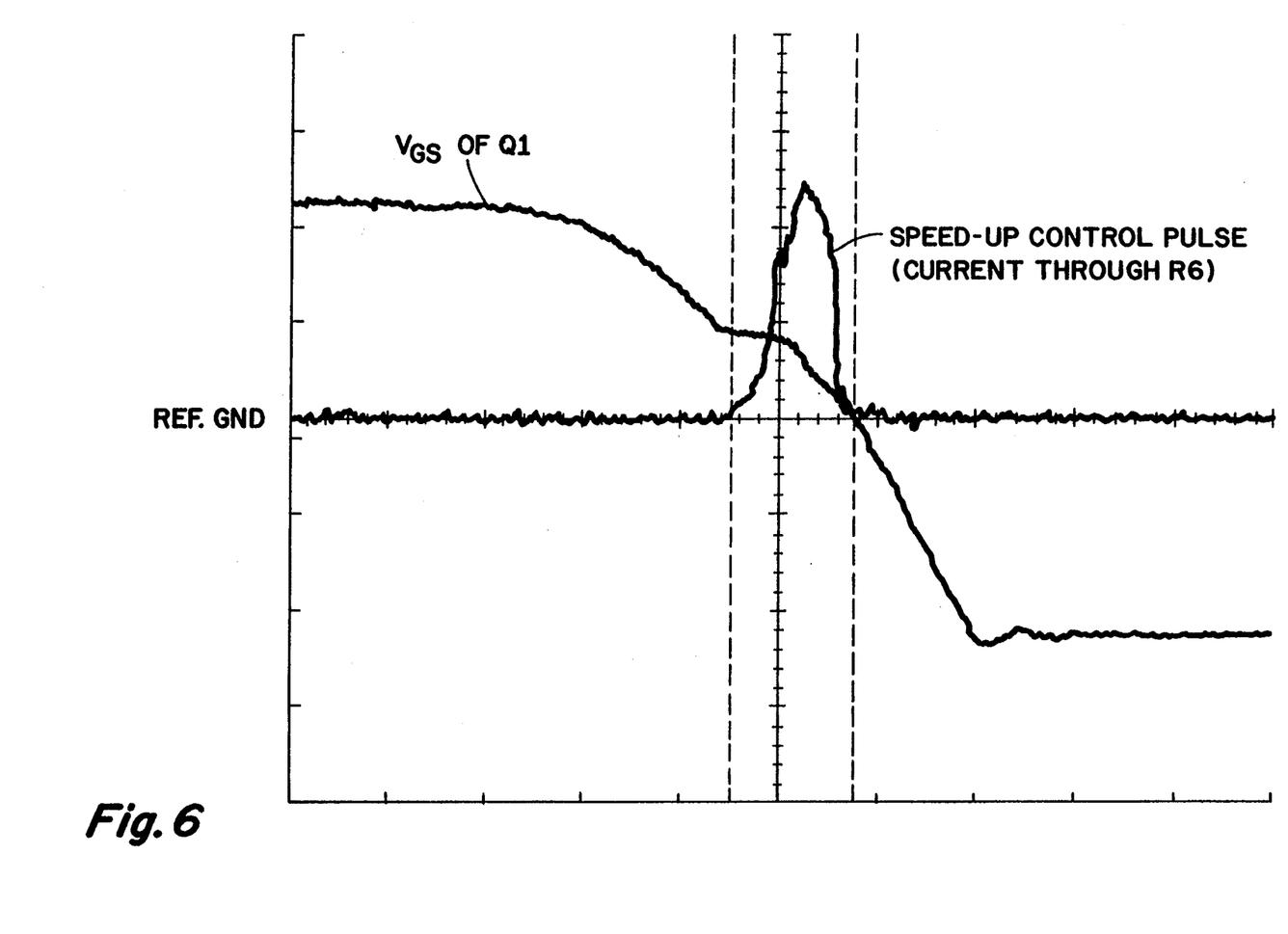

In order to speed up the switching operation of Q1 and Q2, a speed-up control signal is derived from the load current. The speed-up control signal results from the portion of the load current flowing through the series network of R6, C5 and T1D, during the interval where either Q1 or Q2 is beginning to turn-off. As seen in FIG. 6, the speed up pulse becomes effective for turning on the alternate switching device Q1 or Q2 following only a short duration in which the switching device Q1 or Q2 has been turned off. In the operation of the sampling/switch control circuit 30, the resistor R6 serves a dual purpose. On the one hand, resistor R6 serves to dampen any parasitic oscillations which may be caused by the interaction of parasitic capacitances associated with switching devices Q1 and Q2, and the inductance associated with transformer T1. Additionally, resistor R6 is effective for limiting the peak current through switching device Q1 during start-up, which is the time that the sidac (not shown) fires to commence the switching action between Q1 and Q2. A 4-turn transformer winding T1D, connected in series with resistor R6 allows for the injection of the control signal onto the gate electrodes g1 or g2 of the respective switching devices Q1 and Q2. This speed-up control signal is coupled to the respective gate electrodes g1 and g2 over respective 60-turn transformer windings T1B and T1A. Also disposed in the series circuit which includes the resistor R6 and transformer winding T1D, is a snubbing capacitor Cs which is effective for limiting the magnitude of the voltage rise with respect to time of the drain to source voltage of either Q1 or Q2. As applied in this manner, the snubbing capacitor Cs will reduce the rate of change of the drain to source voltage to acceptable levels by acting as an intermediate storage element during the switching interval, thus diverting the load current away from the device that is being switched off, Q1 or Q2, and thereby reducing the power dissipated in the switching devices Q1 and Q2. The effect of snubbing capacitor Cs can be seen with reference to FIG. 7 in which separate current (Ids) and voltage (Vds) waveforms are shown. In the top portion which utilizes capacitor, Cs the point at which the voltage Vds intersects the current signal Ids is such that the resultant dynamic losses indicated as area (c) below the intersecting point, are greatly reduced relative to those experienced in a circuit not utilizing a snubbing capacitor. As seen in the lower waveforms of FIG. 7, the area (d) beneath the intersecting point is significantly larger. In operation, during the switching interval, the equivalent circuit of the electronic ballast arrangement 20 is one in which the resonant circuit 14 and lamp 12 are coupled on one end to a junction point between switching devices Q1 and Q2 and on the other end, to a junction point between blocking capacitors C3 and C4. Assuming that at the time of switching, the change in voltage with respect to time across capacitors C3 and C4 is zero, it can be seen that the change in drain to source voltage V(Q) is approximately equal to the load current during the switch interval i(SW) divided by the snubbing capacitance (Cs) or, in other words:

$$\frac{dV(Q)}{dt} = \frac{i(SW)}{Cs} \qquad (2)$$

Since the sampling/switch control circuit 30 is connected in parallel to the resonant circuit 14, lamp 12 arrangement, it can be appreciated that a portion of the load current is diverted away from the switching arrangement. It can further be appreciated that the snubbing capacitor Cs, by functioning in the step of limiting the voltage rate of change and also functioning as an integral component of the sampling/switch control circuit 30 which establishes the duration of the speed-up control pulse, accomplishes a dual task using only a single element thereby reducing cost and conserving space within the housing wherein the electronic lamp ballast circuit 20 is disposed.

Referring again to equation (1) previously discussed with respect to the calculation of the fundamental component associated with the ballast circuit 10 shown in FIG. 1, ($\omega_1 = \pi/tr$), in order to calculate this fundamental component of the electronic ballast circuit 20 as shown in FIG. 3, it is to be understood that the value of the rise time component (tr) of the present circuit has been selected to be 400 nanoseconds and that such selected rise time value can be accomplished by proper selection of the components of the sampling/switch control circuit 30 using conventional means, typical values of which are shown in attached TABLE I. After plugging this rise time value into equation (1), it can be appreciated that the resultant fundamental component associated with the electronic ballast circuit 20 of the present invention will be below 400 kHz and therefore will avoid the generation of EMI in the compliance band previously noted. Of further significance is that, although the longer rise time value avoids the problem of EMI in the compliance band, typically, in the operation of the lamp 12, such a rise time value would result in a notable rise in the rate of change in the drain to source voltage and hence the need for the switching devices Q1 and Q2 to dissipate more power than a circuit having a shorter duration speed-up pulse would require. It is known that an increased dissipation of power can be a critical factor in the operation of a compact fluorescent product given that the housing in which the ballast circuit is located is typically constructed of a plastic material and must be sized so as to fit within a standard household lighting fixture. By limiting the rate of change in drain to source voltage and thereby reducing the power needed to be dissipated, thermal conditions within the lamp housing can be more readily accommodated.

Figure 8:
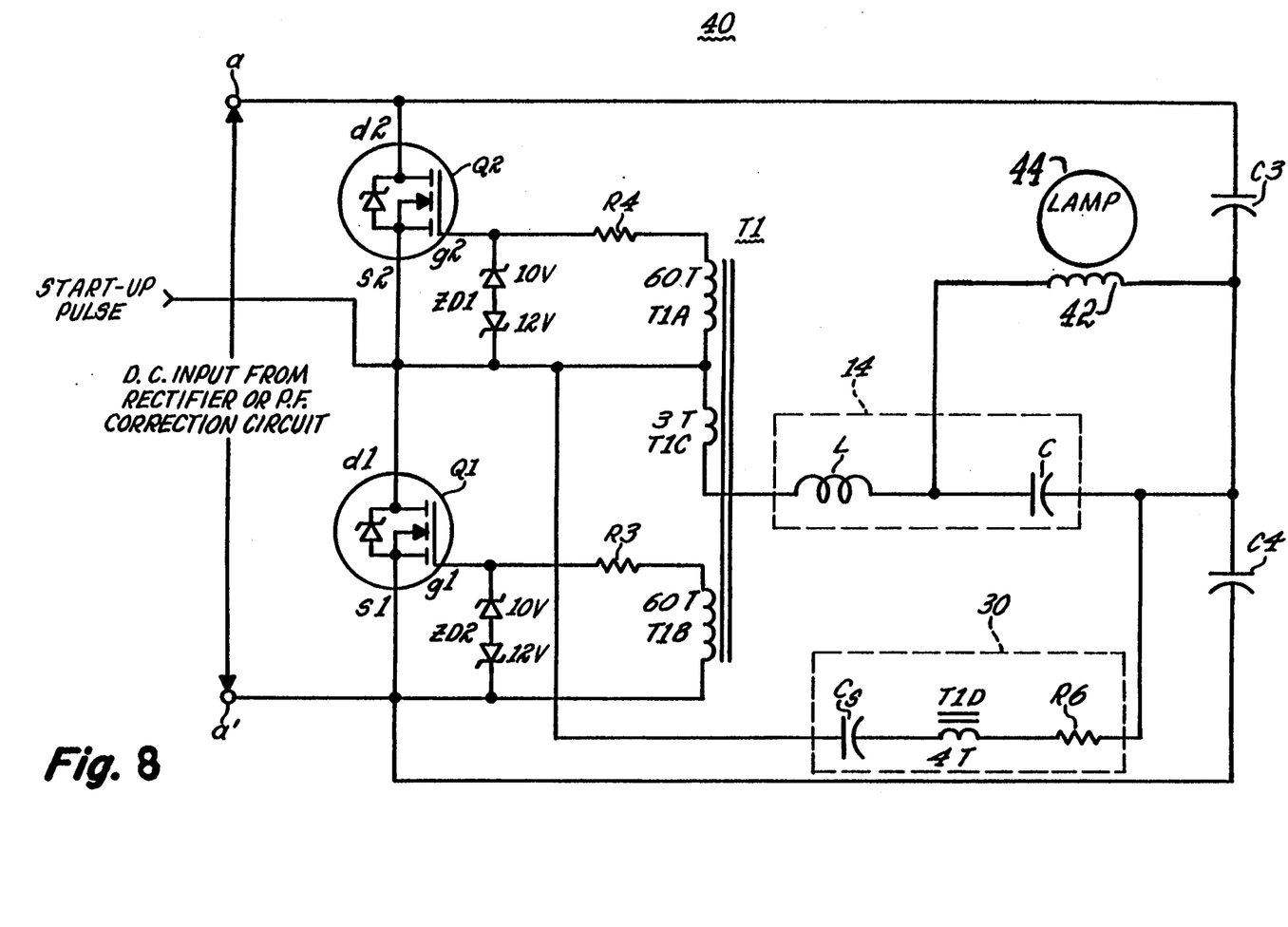
FIG. 8 is a schematic representation of the electronic ballast circuit of FIG. 2 adapted for use with an electrodeless compact fluorescent lamp.

As seen in FIG. 8, an alternate embodiment of the electronic ballast circuit of the present invention is utilized in conjunction with an electrodeless fluorescent lamp 44 which is energized by inductive coupling from RF coil 42. The inductive coupling of energy from the RF coil 42 to the plasma within lamp 44 causes a 1 turn toroidal discharge to be excited within the lamp envelope. In a typical electrodeless fluorescent lamp arrangement, the operating frequency of the lamp is typically in the range of greater than 2 mHz although sustained operation of the discharge at frequencies of approximately 400 kHz has been achieved. It is to be understood that at such typical operating frequencies, the values of the components which make up resonant circuit as well as those that make up the switch control arrangement 30 would have to be selected differently than shown in TABLE I, such selection being contemplated as being within the capabilities of one skilled in the art.

Although the hereinabove described embodiment of the invention constitutes a preferred embodiment, it should be understood that modifications can be made thereto without departing from the scope of the invention as set forth in the appended claims. For instance, though the preferred embodiment illustrates that the sample/switch control circuit utilizes analog components to perform the task of sampling and then developing the control signal which is coupled to the switching devices, it would be possible to utilize digital sampling and control techniques to perform the function of controlling the switching devices in the manner discussed herein. Additionally, although the previous discussion has been directed primarily to an electronic ballast arrangement for a compact fluorescent lamp, it can be appreciated that the principles of the present invention apply equally as well to other discharge lamp ballast circuits where it is desired to minimize dynamic losses without generating unwanted interference.

TABLE 1

| DEVICE | PRODUCT DESIGNATION (SUPPLIER)/VALUE |
|---|---|
| Q1, Q2 | HEXFET Model No. IRFR214 (International Rectifier) |
| ZD1, ZD2 | 10 V Zener Diode Model No. ZMM10 |
|  | 12 V Zener Diode Model No. ZMM12 (ITT) |
| T1 | Multiple Winding Transformer |
|  | Winding A: 60 Turns |
|  | Winding B: 60 Turns |
|  | Winding C: 3 Turns |
|  | Winding D: 4 Turns |
| L | 1 mH |
| C | 0.0047 Microfarads, 1 KV |
| C3, Cr | 0.15 Microfarads, 100 V |
| R6 | 100 Ohms |
| Cs | 220 Picofarads |
| Lamp | 18 Watt Quad-Axis Fluorescent |

What I claim as new and desire to secure by Letters Patent of the United States is:

1. A ballast circuit arrangement for a discharge lamp operable using power line current and comprising:
    means for receiving and conditioning said power line current so as to achieve a conditioned signal therefrom;
    switching means receptive of said conditioned signal and being effective for generating a high frequency pulsed signal in response to a control signal having a predetermined duration associated therewith;
    a resonance circuit having said high frequency pulsed signal coupled thereto, said resonance circuit being effective so as to develop an operating signal for driving said discharge lamp at an appropriate operating frequency in response to said high frequency pulsed signal; and,
    control means for generating said control signal, said control means capable of sampling said operating signal and generating said control signal therefrom, said control means generating said control signal at said predetermined duration so as to prevent generation of electromagnetic interference at a specified range, said control means further being coupled to said switching means such that, during a transition between an off and an on condition of said switching means, energy is diverted away from said switching means.

2. A ballast circuit arrangement as set forth in claim 1 wherein said switching means includes a pair of power MOSFET switching devices operable to alternating on and off conditions in response to said control signal being coupled to respective gate terminals thereof and whereby the output of said pair of switching devices, upon the occurrence of such alternating on and off conditions, is said high frequency pulsed signal.

3. A ballast circuit arrangement as set forth in claim 2 further comprising a pair of blocking elements each connected between a respective one of said pair of switching devices and said discharge lamp and being effective so as to prevent said conditioned signal from being coupled to said discharge lamp.

4. A ballast circuit arrangement as set forth in claim 1 further comprising means for coupling said high frequency pulsed signal from said switching means to said resonance circuit.

5. A ballast circuit arrangement as set forth in claim 4 wherein said coupling means includes a transformer member having a speed up winding disposed in a series circuit arrangement which comprises said control means, said speed up winding being effective for transformer coupling said control signal to said switching means.

6. A ballast circuit arrangement as set forth in claim 5 wherein said transformer further includes a primary winding connected between said switching means and said resonance circuit and at least one additional winding connected to said switching means for communication of said control signal thereto.

7. A ballast circuit arrangement as set forth in claim 1 wherein said control means includes a series circuit having a resistive and a capacitive element having respective values selected so as to set the duration of said control signal to a value that avoids EMI in such specified range, and thereby allowing that said capacitive element serve a dual purpose relating to said control signal duration and to diverting such energy away from said switching means.

8. A ballast circuit arrangement as set forth in claim 7 wherein said duration of said control signal is at least 400 nanoseconds.

9. A ballast circuit arrangement as set forth in claim 5 wherein said series circuit arrangement that comprises said control means is connected across said resonance circuit and said lamp such that said control means samples said operating signal in a manner to sense load current.

10. A ballast circuit arrangement as set forth in claim 1 wherein said receiving and conditioning means includes a power factor correction circuit and a rectifier circuit.

11. A ballast circuit arrangement for a discharge lamp operable using power line current and comprising:
   means for conditioning said power line current so as to achieve a conditioned DC signal therefrom;
   switching means receptive of said conditioned DC signal and being effective for generating therefrom, a high frequency pulsed signal in response to a control signal presented thereto,
   a resonant circuit having said high frequency pulsed signal coupled as an input thereto, said resonant circuit being effective such that an operating signal for driving said discharge lamp at an appropriate operating frequency is generated in response to said high frequency pulsed signal;
   control means coupled across said resonant circuit and being effective for sampling said operating signal and developing therefrom, said control signal, said control means further being coupled to said switching means such that during a transition from an off to an on condition of said switching means, energy is diverted from said switching means to said control means.

12. A ballast circuit arrangement as set forth in claim 11 wherein said resonant circuit includes an inductive element and a capacitive element having respective inductance and capacitance values associated therewith which are selected so as to achieve said appropriate operating frequency of said discharge lamp.

13. A ballast circuit arrangement as set forth in claim 11 wherein said control means is further disposed across said discharge lamp and is effective for limiting magnitude of voltage component rise with respect to time of drain to source voltage of said switching means by diverting a portion of said operating signal from being coupled back to said switching means.

14. A ballast circuit arrangement as set forth in claim 13 wherein said control means includes a snubbing capacitor effective for storing said voltage component of power therein during an interval in which said switching means switches between an on and an off condition.

* * * * *